(12) United States Patent
Okawa

(10) Patent No.: US 6,640,639 B2
(45) Date of Patent: Nov. 4, 2003

(54) PRESSURE SENSOR

(75) Inventor: Michio Okawa, Gyoda (JP)

(73) Assignee: Surpass Industry Co., Ltd., Saitama-ken (JP)

( * ) Notice: Subject to any disclaimer, the term of this patent is extended or adjusted under 35 U.S.C. 154(b) by 0 days.

(21) Appl. No.: 10/226,510

(22) Filed: Aug. 23, 2002

(65) Prior Publication Data

US 2003/0037618 A1 Feb. 27, 2003

(30) Foreign Application Priority Data

Aug. 24, 2001 (JP) ..................................... P2001-254920

(51) Int. Cl.[7] .................................................. G01L 7/00
(52) U.S. Cl. ......................................................... 73/706
(58) Field of Search ........................... 73/706, 714, 753, 73/756; 138/109, 125; 285/222.1–222.5, 226, 238, 239

(56) References Cited

U.S. PATENT DOCUMENTS 6,409,225 B1 * 6/2002 Ito .......................... 285/222.1

* cited by examiner

Primary Examiner—William Oen
(74) Attorney, Agent, or Firm—Thelen Reid & Priest LLP; Robert E. Krebs

(57) ABSTRACT

A pressure sensor according to the present invention comprises a pressure measuring portion which is composed of a resin and contacts fluid, and a sensor element which measures pressure imposed on the pressure measuring portion. Furthermore, a conductive layer having electrical conductivity is provided between the pressure measuring portion and the sensor element, and the conductive layer is connected to a ground. According to this pressure sensor, static electricity accumulated in the pressure measuring portion is released to a ground through the conductive layer without being transmitted to the sensor element.

20 Claims, 3 Drawing Sheets

PRESSURE SENSOR

PRIORITY CLAIM

The present application claims priority under 35 U.S.C. §119 based upon Japan Patent Application No. JP2001-254920, filed on Aug. 24, 2001.

FIELD OF THE INVENTION

The present invention relates to a pressure sensor for measuring the pressure of a fluid, and particularly relates to a pressure sensor preferably used for measuring the pressure of a corrosive solution, organic solvent, pure water and another liquids, and gases which are used for wet treatments of semiconductors.

BACKGROUND OF THE INVENTION

Conventionally, in the manufacture of semiconductors such as in very large-scale integration, a large number of wet treatments are performed in processes such as washing and etching of surfaces of wafers and the like. In these treatments, corrosive solutions, organic solvents, and pure water and other liquids such as IPA have purity or detergency higher than those which are used for the treatment of ordinary semiconductors. In addition, some gases are sometimes used for in treatments.

In order to measure the pressure of such fluids, a pressure sensor 20 as shown in FIG. 3 is connected with a tube 22 in which the fluid flows therein by a joint 21. The pressure sensor 20 is, as shown in FIG. 4, composed of a duct 23 in which the fluid from the tube 22 is drawn therein, a sensor element 24 which is provided on the end portion of the duct 23, and a housing 25 which holds the sensor element. A pressure measuring portion 26 which receives pressure of the fluid is provided on the surface of the sensor element 24 which opposes the duct 23. Furthermore, an outside of the sensor element 24 is covered by a cap 28, and the sensor element 24 is held in the housing 25 so as to contact with the pressure measuring portion 26 by the cap 28.

When the fluid is a corrosive solution, the housing 25 and pressure measuring portion 26 are mainly made of a fluororesin which has a high chemical resistance, and when the fluid is pure water or IPA, the housing 25 is mainly made of metal.

The sensor element 24 has a circuit for converting the stress toward the pressure measuring portion 26 into electrical signals. This circuit includes a Wheatstone bridge circuit composed of four resistors R1–R4 as shown in FIG. 5, and an output voltage $V_{out}$ is changed to comply with the change of resistors R1–R4. When no pressure is applied on the sensor element 24, this output voltage $V_{out}$ is zero; however, when pressure is applied on the sensor element 24 and resistance of the resistors R1–R4 changes, the output voltage $V_{out}$ also changes, and this value of the output voltage $V_{out}$ is converted to the pressure value of the fluid.

As shown in FIG. 6, in these resistors R1–R4, the resistors R2 and R4 are provided at a central portion of the sensor element 24, and the resistors R1 and R3 are provided at edge portions of the sensor element 24. When pressure is applied to the sensor element 24 from the fluid through the pressure measuring portion 26, the resistors R2 and R4 which are provided at the central portion of the sensor element 24 are extended and their resistances increase, and the resistors R1 and R3 which are provided at the edge portions of the sensor element 24 are pressed from both sides and their resistances decrease. As a result, the output voltage $V_{out}$ also changes to comply with the change of the pressure on the sensor element 24, and the pressure of the fluid which flows in the tube 22 can be measured from the value of the output voltage $V_{out}$.

When the housing 25 is made of a resin which has high chemical resistance, since the resin is easily electrified, friction occurs between the inner surface of the tube 22 and the fluid which flows in the tube 22, and static electricity generated by this friction is accumulated in the part in the vicinity of the duct 23 of the housing 25 and the pressure measuring portion 26. The static electricity accumulated in the pressure measuring portion 26 is discharged to the sensor element 24 in proportion to the operating time of the pressure sensor 20. As a result, noise is caused in circuits in the sensor element 24 or the circuit is damaged by electrical discharge, and a measurement of the pressure is inadequately performed or cannot be performed. When the housing 25 is made of metal, although the static electricity does not accumulate in the housing 25, the static electricity still accumulates in the pressure measuring portion 26 and is discharged to the sensor element 24.

To solve this problem, the structure having a lead wire 29 which connects the cap 28 and a ground is proposed. According to this structure, the static electricity can be released from the pressure measuring portion 26 through the lead wire 29 when a fluid such as the high purity corrosive solution or pure water, or gases, flows in the tube 22.

However, when the housing 25 is made of a resin which is easily electrified and a fluid which easily generates static electricity such as IPA or other alcohol, or gases, flows in the tube 22, since static electricity which is higher than the normal level is generated, the static electricity cannot be entirely released through the lead wire 29 since the lead wire 29 is not directly connect with the pressure measuring portion 26. As a result, the possibility of the discharge of the static electricity still remains.

SUMMARY OF THE INVENTION

The present invention is prepared in consideration of the above circumstances, and a purpose of the present invention is to provide a pressure sensor which has high chemical resistance and high discharge capacity of static electricity.

In order to achieve the above purpose, the pressure sensor of the first aspect of the present invention comprises a pressure measuring portion which is composed of a resin and contacts fluid, and a sensor element which measures pressure imposed on the pressure measuring portion; wherein a conductive layer which is composed of a foil having electric conductivity is provided between the pressure measuring portion and sensor element, and the conductive layer is connected to a ground.

The pressure sensor of the second aspect of the present invention comprises a pressure measuring portion which is composed of a resin and contacts fluid, and a sensor element which measures pressure imposed on the pressure measuring portion; wherein a conductive layer which is composed of meshes having electric conductivity is provided between the pressure measuring portion and sensor element, and the conductive layer is connected to a ground.

According to the pressure sensors having the above structures, the static electricity accumulated in the pressure measuring portion is released from the pressure measuring portion through the conductive layer. Therefore, discharge of the static electricity accumulated in the pressure measuring portion to the sensor element and harmful effect caused by this discharge are prevented.

In the pressure sensors having the above structures, it is preferable that the sensor element be held in a housing of the pressure sensor via a cap which is composed of a material having electric conductivity and is connected to a ground, and that the conductive layer contact the cap.

According to the pressure sensor having the above structure, the sensor element is reliably held in the housing via the cap. Furthermore, the conductive layer provided between the pressure measuring portion and sensor element is easily connected to a ground by contacting the conductive layer with the cap and connecting the cap to a ground. Therefore, the manufacturing and assembly of the pressure sensor are simplified.

BRIEF EXPLANATION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DESCRIPTION OF THE PREFERRED EMBODIMENTS

Embodiments of the present invention are described herein in the context of a pressure sensor. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A preferred embodiment of the present invention will be presented in the following with reference to FIGS. 1 and 2.

Figure 1:
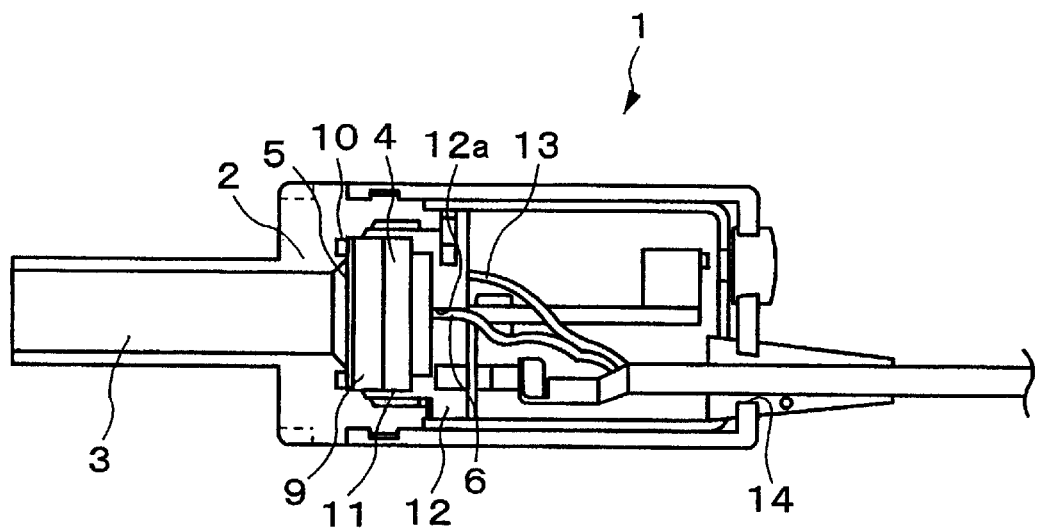
FIG. 1 is a longitudinal sectional view of an embodiment of the pressure sensor of the present invention.

FIG. 1 is a longitudinal sectional view of an embodiment of a pressure sensor 1 of the present invention. As shown in FIG. 1, in this pressure sensor 1, a duct 3 in which fluid flows therein is provided at one end (front end) of a housing 2 which has a roughly cylindrical shape and is made of a fluororesin. A sensor element 4 is provided on an end portion of the duct 3 and a pressure measuring portion 5 is provided on a front end of the sensor element 4 so as to face with the duct 3 and to contact with the fluid induced in the duct 3.

Here, an "inline type" housing in which both ends of the duct 3 are connected with a tube 22 and the pressure measuring portion 5 is provided on the outer surface of the duct 3 may be employed as the housing 2.

The pressure measuring portion 5 is made of a material having high chemical resistance and is hardly corroded by corrosive solutions which contain nitric acid ($HNO_3$), hydrochloric acid (HCl), sulfuric acid ($H_2SO_4$), and hydrogen fluoride (HF), and the like. The pressure measuring portion 5 is made of a sheet of fluororesin, and the sensor element 4 is made of ceramics, for example.

Figure 5:
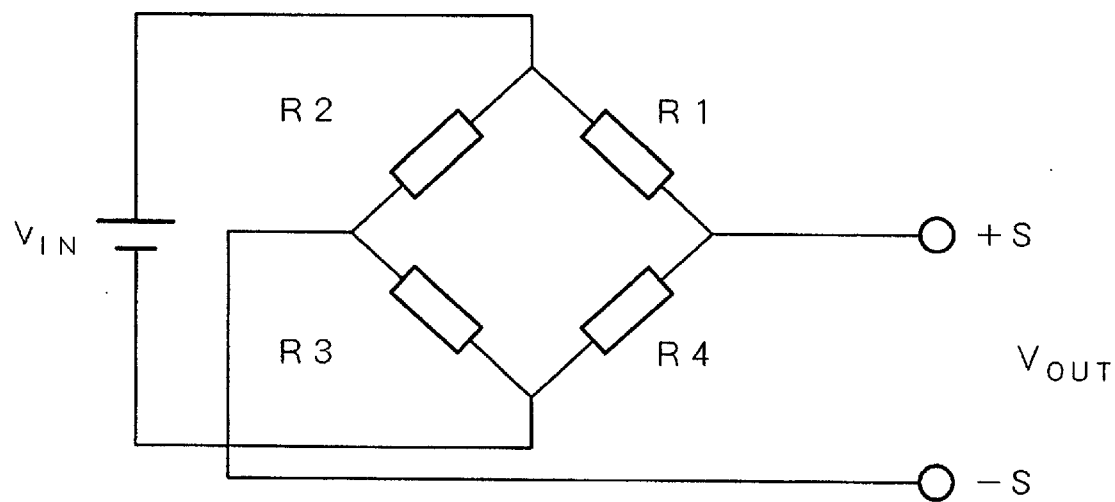
FIG. 5 is a circuit diagram provided in the sensor element of the pressure sensor.
Figure 6:
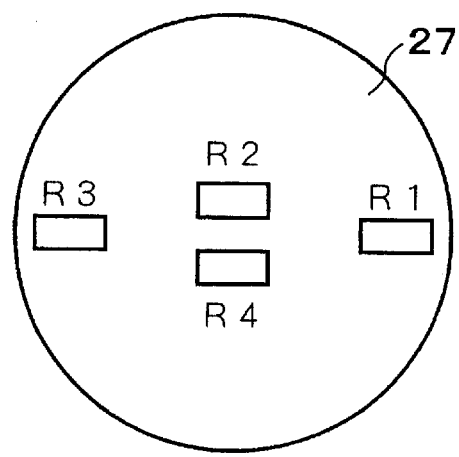
FIG. 6 is a schematic diagram to explain the structure of the sensor element of the pressure sensor.

An aluminum foil (conductive layer) 9 as a foil which has conductivity is affixed on a front surface of the sensor element 4 which faces the pressure measuring portion 5 and a front part of an outer periphery of the sensor element 4. Furthermore, a circuit for converting the stress toward the pressure measuring portion 5 to electric signals is provided in the sensor element 4, and a lead wire 6 which outputs signals from the circuit to an exterior is connected with a rear surface of the sensor element 4. Further explanation of the circuit is omitted since the structure of this circuit is identical to the conventional circuit as shown in FIGS. 5 and 6.

Furthermore, in the sensor element 4, a straingauge pressure sensor which measures the pressure toward the pressure measuring portion 5 by the Wheatstone bridge circuit is used; however, other sensor elements such as a piezoelectric type or a capacitance type sensor element may be employed.

An outer peripheral portion of a front surface of the pressure measuring portion 5 is sealed by an O-ring 10 provided thereon. Furthermore, the sensor element 4 is held by a cap 12 which is made of conductive material by inserting the rear part of the sensor element 4 into an opening 11 which opens on a front surface of the cap 12. The cap 12 is engaged into the housing 2 from the rear side, and therefore, the sensor element 4 is held by the housing 2 via the cap 12.

Figure 2:
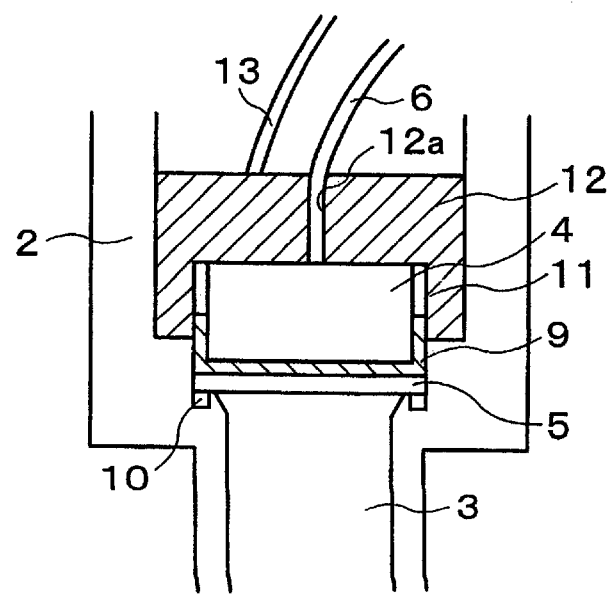
FIG. 2 is a schematic longitudinal sectional view of an embodiment of the pressure sensor of the present invention.
Figure 3:
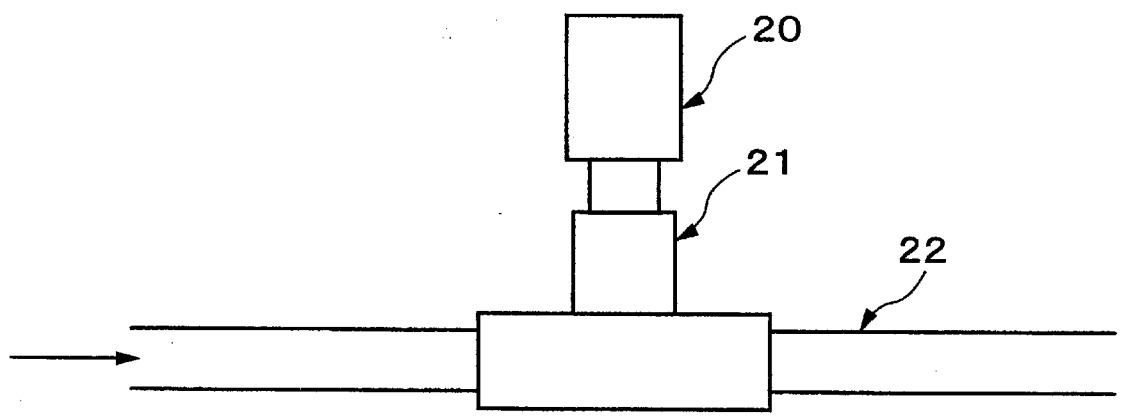
FIG. 3 is a schematic side view of an embodiment of the pressure sensor.
Figure 4:
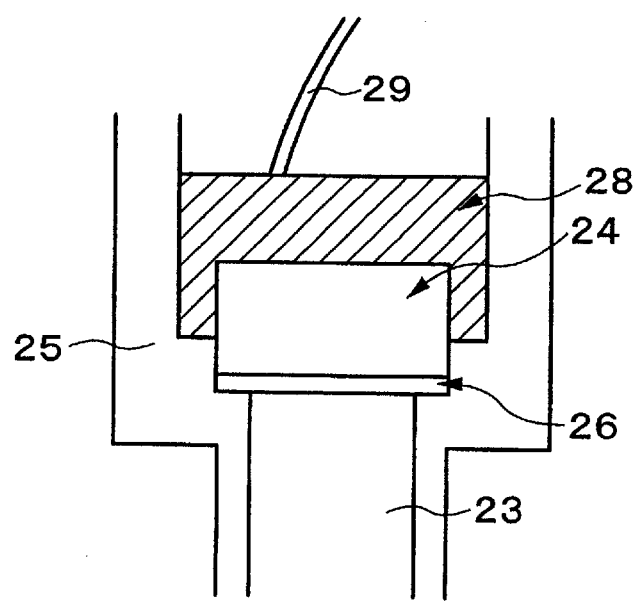
FIG. 4 is a schematic longitudinal sectional view of an embodiment of the conventional pressure sensor.

In addition, as shown in FIG. 2, an outer peripheral portion of the aluminum foil 9 which is turned down along the outer peripheral surface of the sensor element 4 contacts with an inner peripheral surface of the opening 11 of the cap 12.

A hole 12a which penetrates the cap 12 along the axial direction thereof is provided on a bottom surface of the opening 11, and the lead wire 6 passes through the hole 12a and projects from the rear surface of the cap 12 in the rearward direction. Furthermore, a shielded wire 13 for connecting the cap 12 to a ground is connected on the rear surface of the cap 12. The lead wire 6 and shielded wire 13 are led to the exterior via a hole 14 of the housing 2 and is connected to a ground.

When the fluid is drawn in the duct 3 and the stress is imposed on the pressure measuring portion 5, the stress is converted to electrical signals by the sensor element 4, and the signals are led to the exterior through the lead wire 6 and are further converted to the pressure value of the fluid.

At this time, static electricity, which is caused by friction between the inner surface of the tube 22 and the fluid which flows in the tube 22 and is accumulated in the pressure measuring portion 5 and is released from the pressure measuring portion 5 to the cap 12 through the aluminum foil 9 without being transmitted to the sensor element 4. This static electricity is further dissipated from the cap 12 to a ground through the shield wire 13.

Therefore, in the pressure sensor 1 having the above-described structure, discharge of the static electricity accumulated in the pressure measuring portion 5 to the sensor element 4 and harmful effects of caused by this discharge are prevented.

Furthermore, since the sensor element 4 is held by a cap 12 which is engaged with the housing 2, the sensor element 4 is reliably held in the housing 2 via the cap 12. In addition, since the outer peripheral portion of the aluminum foil 9 is turned down along the outer peripheral surface of the sensor element 4 and contacts the cap 12, the aluminum foil 9 provided between the pressure measuring portion 5 and sensor element 4 is easily connected to a ground without directly connecting the shielded wire 13 to the aluminum foil 9. Therefore, the manufacture and assembly of the pressure sensor 1 are simplified.

Moreover, the harmful effects of the static electricity discharged on the sensor element 4 can be prevented more effectively by employing metal having low conductivity such as stainless steel as a material of the housing 2, since the accumulation of the static electricity is thereby limited.

When using the pressure sensor 1 having the housing 2 which is made of metal in a manufacturing process of semiconductors, an electrolytic polishing is performed on the housing 2 in order to prevent an effluence of metal component of the housing 2 into the fluid which flows in the tube 22. By performing the electrolytic polishing on the housing 2, even if the housing 2 which is made of metal, contacts the corrosive solution or the gas thereof, the effluence of the metal component of the housing 2 can be prevented.

In the above-described pressure sensor 1, the aluminum foil 9 is employed as the conductive layer; however, the material of the conductive layer is not limited to the aluminum foil 9, and it is a matter of course that the same effects can be obtained by employing other metals which have conductivity as the material of the conductive layer. furthermore, the conductive layer may be composed of mesh having electric conductivity.

Moreover, in the above-described pressure sensor 1, the pressure measuring portion 5 is provided on the front surface of the sensor element 4; however, the same effect can be obtained when the pressure measuring portion 5 is composed of a diaphragm which is united with the housing 2.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A pressure sensor comprising: a pressure measuring portion which comprises a resin and contacts fluid, and a sensor element which measures pressure imposed on said pressure measuring portion;
   wherein a conductive layer having electrical conductivity is provided between said pressure measuring portion and said sensor element, and said conductive layer is connected to a ground.

2. A pressure sensor according to claim 1, wherein said conductive layer is composed of a foil provided between said pressure measuring portion and said sensor element.

3. A pressure sensor according to claim 1, wherein said conductive layer is composed of mesh provided between said pressure measuring portion and said sensor element.

4. A pressure sensor according to claim 1, wherein said sensor element is held in a housing of said pressure sensor via a cap which is composed of a material having electrical conductivity and is connected to a ground, and said conductive layer contacts said cap.

5. A pressure sensor according to claim 2, wherein said sensor element is held in a housing of said pressure sensor via a cap which is composed of a material having electrical conductivity and is connected to a ground, and said conductive layer contacts said cap.

6. A pressure sensor according to claim 3, wherein said sensor element is held in a housing of said pressure sensor via a cap which is composed of a material having electrical conductivity and is connected to a ground, and said conductive layer contacts said cap.

7. A pressure sensor according to claim 2, wherein said conductive layer is composed of an aluminum foil provided between said pressure measuring portion and sensor element.

8. A pressure sensor according to claim 5, wherein said conductive layer is composed of an aluminum foil provided between said pressure measuring portion and sensor element.

9. A pressure sensor according to claim 1, wherein said pressure measuring portion is made of a fluororesin and said sensor element is made of ceramics.

10. A pressure sensor according to claim 2, wherein said pressure measuring portion is made of a fluororesin and said sensor element is made of ceramics.

11. A pressure sensor according to claim 3, wherein said pressure measuring portion is made of a fluororesin and said sensor element is made of ceramics.

12. A pressure sensor according to claim 4, wherein said pressure measuring portion is made of a fluororesin and said sensor element is made of ceramics.

13. A pressure sensor according to claim 5, wherein said pressure measuring portion is made of a fluororesin and said sensor element is made of ceramics.

14. A pressure sensor according to claim 6, wherein said pressure measuring portion is made of a fluororesin and said sensor element is made of ceramics.

15. A pressure sensor according to claim 7, wherein said pressure measuring portion is made of a fluororesin and said sensor element is made of ceramics.

16. A pressure sensor according to claim 8, wherein said pressure measuring portion is made of a fluororesin and said sensor element is made of ceramics.

17. A pressure sensor according to claim 4, wherein an outer peripheral portion of said conductive layer is turned down along an outer peripheral surface of said sensor element and contacts with an inner peripheral surface of an opening of said cap in which said sensor element is held therein.

18. A pressure sensor according to claim 5, wherein an outer peripheral portion of said conductive layer is turned down along an outer peripheral surface of said sensor element and contacts with an inner peripheral surface of an opening of said cap in which said sensor element is held therein.

19. A pressure sensor according to claim 6, wherein an outer peripheral portion of said conductive layer is turned down along an outer peripheral surface of said sensor element and contacts with an inner peripheral surface of an opening of said cap in which said sensor element is held therein.

20. A pressure sensor according to claim 8, wherein an outer peripheral portion of said conductive layer is turned down along an outer peripheral surface of said sensor element and contacts with an inner peripheral surface of an opening of said cap in which said sensor element is held therein.

* * * * *